(12) United States Patent
Huemmer et al.

(10) Patent No.: US 12,450,733 B2
(45) Date of Patent: Oct. 21, 2025

(54) METHOD AND APPARATUS FOR THE EVALUATION OF MEDICAL IMAGE DATA

(71) Applicant: Siemens Healthineers AG, Forchheim (DE)

(72) Inventors: Christian Huemmer, Lichtenfels (DE); Sailesh Conjeti, Erlangen (DE); Alexander Preuhs, Erlangen (DE); Lei Wang, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 479 days.

(21) Appl. No.: 17/838,842

(22) Filed: Jun. 13, 2022

(65) Prior Publication Data

US 2022/0398729 A1 Dec. 15, 2022

(30) Foreign Application Priority Data

Jun. 15, 2021 (DE) ..................... 10 2021 206 108.7

(51) Int. Cl.
*G06T 7/12* (2017.01)
*G06T 7/00* (2017.01)
(Continued)

(52) U.S. Cl.
CPC .......... *G06T 7/0012* (2013.01); *G06V 10/764* (2022.01); *G06V 10/82* (2022.01);
(Continued)

(58) Field of Classification Search
CPC ......... G06T 7/0022; G06T 2207/20081; G06T 2207/20084; G06T 2207/30168; G06V 10/82; G06V 10/764; G06V 2201/03
(Continued)

(56) References Cited

U.S. PATENT DOCUMENTS 11,443,428 B2 * 9/2022 Petersen ............. G06F 18/2415
11,847,819 B2 * 12/2023 Vilsmeier ............. G06V 10/26
(Continued)

FOREIGN PATENT DOCUMENTS

EP 3667674 A1 6/2020

OTHER PUBLICATIONS

Oakden-Rayner L.: The Rebirth of CAD: How Is Modern AI Different from the CAD We Know?, Radiology artificial intelligence, vol. 1, No. 3, 2019.
(Continued)

*Primary Examiner* — William D Titcomb
(74) *Attorney, Agent, or Firm* — Harness, Dickey & Pierce, P.L.C.

(57) ABSTRACT

A method for evaluation of medical image data comprises: providing medical image data of a patient to be examined; determining, for at least one segment of the medical image data, a respective classification probability value with respect to at least one classification from a list of specified classifications; determining a patient-specific relevance criterion for at least one classification for at least the at least one segment of the medical image data; and determining a clinical relevance of the at least one classification for the at least one segment of the medical image data using the patient-specific relevance criterion, and at least one of based on the classification probability values or based on the at least one segment of the medical image data.

25 Claims, 3 Drawing Sheets

(51) Int. Cl.
*G06V 10/764* (2022.01)
*G06V 10/82* (2022.01)

(52) U.S. Cl.
CPC ............... *G06T 2207/20081* (2013.01); *G06T 2207/20084* (2013.01); *G06T 2207/30168* (2013.01); *G06V 2201/03* (2022.01)

(58) Field of Classification Search
USPC ........................................................ 382/128
See application file for complete search history.

(56) References Cited

U.S. PATENT DOCUMENTS

| | | | | |
|---|---|---|---|---|
| 11,934,491 | B1* | 3/2024 | Gilinsky | ................ G06N 20/00 |
| 2015/0379708 | A1* | 12/2015 | Abramoff | ........... G06F 18/2135 |
| | | | | 382/128 |
| 2016/0267673 | A1* | 9/2016 | Grbic | ..................... G16H 30/40 |
| 2018/0307912 | A1* | 10/2018 | Selinger | ................. G06V 20/41 |
| 2020/0107818 | A1* | 4/2020 | Keshet | ................. A61B 8/0883 |
| 2020/0113505 | A1* | 4/2020 | Clingman | ............ A61B 5/7275 |
| 2022/0383495 | A1* | 12/2022 | Petersen | ................... G06T 7/13 |

OTHER PUBLICATIONS

Bustos A. et al.: "PadChest: A large chest x-ray image dataset with multi-label annotated reports", arXiv:1901.07441v2 [eess.IV] Feb. 7, 2019.

Irvin, Jeremy et al. "CheXpert: A Large Chest Radiograph Dataset with Uncertainty Labels and Expert Comparison", 2019, arXiv:1901.07031; 2019.

Niemann U. et al.: "Combining Subgroup Discovery and Clustering to Identify Diverse Subpopulations in Cohort Study Data", Data, http://wwwisg.cs.uni-magdeburg.de/visualisierung/wiki/data/media/files/misc/niemann_2017_cbms.pdf.

Xue Z. et al.: "Foreign object detection in chest X-rays", Published 2015 Computer Science, 2015 IEEE International Conference on Bioinformatics and Biomedicine (BIBM).

Song B. et al.: "ROC operating point selection for classification of imbalanced data with application to computer-aided polyp detection in CT colonography", Published in final edited form as: Int J Comput Assist Radiol Surg. Jan. 2014; 9(1): 79-89. doi: 10.1007/s11548-013-0913-8.

Lin et al., "Focal Loss for Dense Object Detection," 2017, Proceedings of the IEEE International Conference on Computer Vision (ICCV), pp. 2980-2988.; 2017.

Atzmüller M. et al.: "Subgroup Discovery—Advanced Review", Knowledge and Data Engineering Group, University of Kassel, Germany atzmueller@cs.uni-kassel.de.

Qin J. et al.: "Computer-aided detection in chest radiography based on artificial intelligence: a survey", BioMedical Engineering OnLine vol. 17, Article No. 113 (2018).

Helal S. et al.: "Subgroup Discovery Algorithms: A Survey and Empirical Evaluation", Journal of Computer Science and Technology vol. 31, pp. 561-576 (2016).

Xu T. et al.: "Multimodal Deep Learning for Cervical Dysplasia Diagnosis", https://faculty.ist.psu.edu/suh972/Multimodal_MICCAI16.pdf.

Haghanifar A. et al.: "COVID-CXNET: Detecting COVID-19 in Frontal Chest X-Ray Images Using Deep Learning", arXiv:2006.13807v2 [eess. IV] Jul. 29, 2020.

Preuhs, Alexander et al. "Appearance Learning for Image-based Motion Estimation in Tomography" IEEE Transactions on Medical Imaging, vol. 39, No. 11, Nov. 2020 // DOI: 10.1109/TMI.2020.3002695.

Volpi R. et al.: "Addressing Model Vulnerability to Distributional Shifts over Image Transformation Sets", arXiv.org; arXiv:1903.11900.

Santos M.K.et al.: "Artificial intelligence, machine learning, computer-aided diagnosis, and radiomics: advances in imaging towards to precision medicine", Radiol. Bras., 2019, 52(6), 387-396.

Zarei, S. et al. "User Loss A Forced-Choice-Inspired Approach to Train Neural Networks Directly by User Interaction." Bildverarbeitung für die Medizin 2019. Springer Vieweg, Wiesbaden, 2019.92-97.

* cited by examiner

METHOD AND APPARATUS FOR THE EVALUATION OF MEDICAL IMAGE DATA

CROSS-REFERENCE TO RELATED APPLICATION(S)

The present application claims priority under 35 U.S.C. § 119 to German Patent Application No. DE 102021206108.7, filed Jun. 15, 2021, the entire contents of which are incorporated herein by reference.

FIELD

Embodiments of the present invention relate to a computer-implemented method for the evaluation of medical image data and to an apparatus for the evaluation of medical image data. In addition, an associated computer program product, a data storage medium and a data stream are provided.

BACKGROUND

Medical imaging methods such as computed tomography (CT), magnetic resonance tomography (MRT), nuclear diagnostics, X-ray diagnostics, etc. are constantly being developed and are being used increasingly. For a long time medical image data has been evaluated completely and solely by certain specialists, who visually examined the image data and drew conclusions therefrom. This procedure is very time-consuming on the one hand and requires excellent training and a great deal of experience on the part of the specialists on the other hand.

Intuitive conclusions, which also take into consideration the overall appearance of the medical image data, are also partially drawn in the assessment of the image data. Complete automation of the evaluation of the medical image data still presents challenges therefore despite constantly advancing image processing technologies.

Methods of what is known as computer-aided diagnostics (CAD) are being used increasingly more frequently, with these methods often still being very rigidly designed. Examples of this can be taken, for example, from the scientific publication by Santos et al., "Artificial intelligence, machine learning, computer-aided diagnosis, and radiomics: advances in imaging towards to precision medicine", DOI: 10.1590/0100-3984.2019.0049.

Conventionally, data is extracted from the medical image material in a first step, with, for example, suspicious points (pixels or voxels, or also previously determined segmentation sections) being determined. This takes place, for instance, in that either individual pixels or voxels, or segments formed therefrom of the image data, are allocated to classifications, and, more precisely, conventionally in such a way that a probability is determined for each possible classification. One possible output of an artificial neural network, which solves a classification task in this way, can thus be one vector per pixel/voxel of the image material, the entries of which vector in each case indicate the probability that the pixel/voxel is allocated to a determined classification. Conventionally, there is also a capture classification such as "remainder" or "background".

In a second step the clinical relevance of the established classification is then assessed using a threshold value. If, for example, a probability of 0.7 is allocated to a pixel for the fact that the pixel falls, for example, into an "anomaly" classification, and if the threshold value is set at 0.8, the supposed anomaly is classified as "not clinically relevant" (or: "not relevant" for short).

SUMMARY

Embodiments of the present invention provide methods and apparatuses, which enable a more specific and thus also more accurate evaluation of medical image data.

A computer-implemented method for the evaluation of medical image data is thus provided, comprising:
providing medical image data of a patient to be examined;
determining, for at least one segment of the medical image data, a respective classification probability value in respect of at least one classification from a list of specified classifications;
determining a patient-specific relevance criterion for at least one of the at least one classifications for (at least) the at least one segment of the provided medical image data; and
determining a clinical relevance of the at least one of the at least one classifications for the at least one segment of the medical image data using the associated determined patient-specific relevance criterion, and based on the determined classification probability values and/or based on the at least one segment.

Furthermore, embodiments of the present invention provide an apparatus for the evaluation of medical image data, comprising:
an input interface via which the apparatus can be provided with medical image data of a patient to be examined;
a computing facility, which is set up:
to determine for at least one segment of the medical image data a respective classification probability value in respect of at least one classification from a list of specified classifications;
to determine a patient-specific relevance criterion for at least one of the at least one classifications for the provided medical image data; and
to determine a clinical relevance of the at least one of the at least one classifications for (at least) the at least one segment of the medical image data using the associated determined patient-specific relevance criterion and based on the determined classification probability values and/or based on the at least one segment; and
an output interface, which is set up to output an output signal, which indicates the determined clinical relevance.

Embodiments of the inventive apparatus are advantageously set up to carry out the inventive method and can thus be adapted in accordance with all variants, modifications and developments of embodiments described for the inventive method, and vice versa.

The evaluation can take place, both in the case of the method as well as the apparatus, in particular in the framework of a computer-aided diagnosis (CAD). This includes for instance computer-aided detection (CADe), computer-aided diagnosis in the narrower sense (CADx), computer-aided detection/diagnosis (CADe/x), and computer-aided triage (CADt).

Medical image data can comprise, in particular, image data (2-dimensional, 3-dimensional or 4-dimensional), which was generated by computed tomography, magnetic resonance tomography, nuclear diagnostics, X-ray diagnostics or the like. The medical image data can represent raw data from a scan or have already passed through one or more preparation step(s) (in particular an image reconstruction method).

A segment of the medical image data can be, in particular, a pixel or voxel. Larger segments can also be combined, however, for instance if a segmenting of image data has been performed (for example by way of an artificial neural network, or other image segmenting method known to a person skilled in the art) and individual segments formed as a result are each classified in their entirety, in other words receive classification probability values. The segments can in particular be those which are pre-selected by an artificial neural network, for instance as "suspicious", "striking", "anomalous" or the like, or which have striking classification probability values according to predefined criteria. Advantageously, known algorithms or methods for object classification can be used for this.

In the present case, the medical image data, which is to be evaluated, should preferably in each case refer to a single examination (or a single scan) or originate therefrom.

It is a fundamental idea of an embodiment of the present invention to not use any fixed threshold values in the assessment of the clinical relevance but to use a patient-specific relevance criterion. "Patient-specific" can also be referred to as "personalized". In accordance with a further idea, such a relevance criterion can describe a quality of the medical image data for a particular purpose (for example findings). In general, a higher quality can result in a lower threshold for clinical relevance, and a lower quality can result in a higher threshold.

A determination based (at least also) on the at least one segment, or decision, can take into account, in particular, properties of the segment, for example its extent, contrast, and the like.

A further fundamental idea of an embodiment includes in that such patient-specific relevance criteria can be determined (preferably solely) on the basis of the medical image data itself (or: "image-intrinsically"). No metadata, no medical history of the patient or the like thus has to be transferred or even just be present—the availability of the medical image data itself is sufficient. If the medical image data is anonymous or anonymized or pseudonymous or pseudonymized, patient-specific relevance criteria can thus be determined without the identity of the patient, or context data, which allow an inference about the identity of the patient, being required.

Those contents of the image data can (depending on the specific embodiment) also be evaluated which do not per se indicate any pathological findings. For example, it is possible (directly or indirectly, for instance by a trained artificial intelligence entity) to differentiate whether pleural lines are clear or diffuse, whether a general texture of the tissue to be examined is clear or diffuse, and the like.

This can contribute to the protection of patient data since potentially only a small part of the data of the patient has to be transferred between different locations or services or software modules, or even has to be known.

Furthermore, the medical image data can "speak for itself", for instance if—due to a particular stress or a hitherto undetected disease—the body of a patient has aged or become weaker much more significantly than the pure age of the patient would suggest.

As will be explained in more detail below, an artificial neural network is particularly preferably used, which as an input receives the medical image data (or at least some of it) and as an output outputs the patient-specific relevance criterion/criteria.

In a simple embodiment the relevance criterion can be formed as a numerical value, preferably as a scalar numerical value, particularly preferably as a probability threshold value, with which a respective classification probability value is compared. Such a probability threshold value, which in the prior art is constant and predetermined, is also referred to there as an operation point.

Hereinafter, for the sake of simplicity the example with numerical probability threshold values will frequently be used as the relevance criteria since it is immediately clear; it is understood, however, that other relevance criteria can also be used, for example formulae, which receive classification probability values as the input, and the like. Such formulae can link for instance different (individual) relevance criteria with the aid of logic operators, weights and the like.

The term "classification" can be equated in many embodiments with the term "finding" since frequently different classifications (or: categories) in each case designate the presence of a determined clinical finding, or indicate a suspicion thereof.

The inventors have found that a—for the evaluation of medical image data—significant patient-specific peculiarity is the age of the patient. The use of patient-specific relevance criteria can thus take into account, for example, the fact that the tissue of older people has different properties compared to the tissue of younger people and is thus sometimes captured differently in imaging methods, for example with fewer clear lines and/or with greater blurriness overall.

This can have a tendency to result, in the case of a comparable scan (in other words, imaging method) and classification by way of the same software in the case of an older person, in considerably more supposed anomalies being found. As already mentioned, in this connection "a tendency to find more anomalies", means that more segments of the image data tend to be allocated to the "anomaly" classification with a classification probability value that has a tendency to be higher in each case.

A fixed probability threshold value set relatively low for the clinical relevance of the "anomaly" classification could in this example accordingly result in potentially too many classifications being classified as clinically relevant in the case of older people. In contrast to this, a fixed probability threshold value set relatively high for the clinical relevance of the "anomaly" classification could result in potentially too few classifications being classified as clinically relevant in the case of younger people.

The problem of a great deal of work for specialists in the subsequent assessment of the evaluation results in the first case. The problem that information that is potentially actually clinically relevant would not automatically be made available to the specialists in the evaluation, and therefore has to be gathered by them with additional effort, results in the second case.

"Determining a clinical relevance" should in particular be taken to mean that it is determined whether an established classification for the at least one segment of the medical data is shown highlighted, or communicated to a specialist (or other medical specialized personnel) or triggers a subsequent workflow ("clinically relevant"), or not ("not clinically relevant").

For example, segments of the medical image data, which have a classification which following application of the patient-specific relevance criterion were classified as "clinically relevant" ("relevant segments" therefore), are shown to medical specialized personnel by way of a display facility with an edge, a border, hatching, coloring or the like overlaid on the image material accordingly, are listed in a list or the like.

Determining the clinical relevance for different segments of the medical image data can thus also occur implicitly in that different methods of representation, workflows, storage systems, metadata or the like are allocated to different segments.

When determining the clinical relevance a differentiation can be made solely into "clinically relevant"/"clinically not relevant". It is also conceivable, however, that, for example, two (or "x") divisions are provided between possible decision outcomes, in other words three (or "x+1") different decision outcomes are possible. For example, two (or "x") probability threshold values could be used, which divides the bandwidth of the classification probability values into three (or "x+1") relevance sectors, for example into "not clinically relevant"/"possibly clinically relevant"/"clinically relevant".

A classification as "clinically relevant" could bring about automatic triggering of a workflow, for example termination of a specific further examination, prioritization of the patient, notification of a specific person such as a lead physician, ordering of particular treatment agents such as drugs or auxiliary items, specific control of an examination device with particular parameters or the like.

A classification as "possibly clinically relevant" could not, by contrast, trigger this, but—as already described—could be shown highlighted, or communicated to a medical specialist. A classification as "not clinically relevant" would not trigger any further consequences. In this way it would be possible to act efficiently and in a time-saving manner in clear cases, and the work of the specialists could be limited to the cases of doubt (in other words "possibly clinically relevant").

A further fundamental idea of an embodiment of the present invention is that the patient-specific relevance criterion (or a plurality thereof) can also be generated on the basis of patient-specific or external context data. Context data in this connection denotes information, which goes beyond the medical image data to be evaluated. This can include, for example, information contained in a DICOM header, or data sources that are even more remote such as a patient medical record, questionnaires, further examination results from manual or imaging examination methods and the like.

Patient-specific context data can refer in this case to the patient to be examined, whereas, in general, context data can also refer to further patients (what are known as "third party patients") or to abstract patient groups. In this way it is possible to also assign the patient to be examined for example to a patient group (which is, for example, separate for each classification) and based on the patient group, to then determine the patient-specific relevance criterion for at least one classification. Known clustering methods can be used for this.

This has an analogy to the previous method: a specialist (for example radiologist) will usually study the patient file before he/she evaluates medical image material of the patient. If the patient file shows that the patient has for example a predisposition to particular diseases, or is a heavy consumer of a particular substance, the specialist will (consciously or unconsciously) take this into account in the evaluation.

Patient groups can accordingly be formed based for instance on:

identical physical properties (age, gender, blood group, genetic factors);
 identical case histories or clinical pictures;
 identical consumer behavior in respect of a substance (for example nicotine, alcohol, a specific medicine);
 and/or the like.

Some patient groups can directly specify particular relevance criteria (for example "probability threshold value X for classification Y if patient is in age group Z") and/or specify adjustments ("multiply previous probability threshold value for clinical relevance by 1.2 if patient is a regular smoker"). Patient groups can specify relevance criteria for in each case one, or for a plurality of, or even for all classifications, depending on which classifications are provided and whether the corresponding group has an impact on the corresponding classification or not, according to current knowledge.

A patient-specific relevance criterion can be used for exactly one possible classification, or for all possible classifications. It is also possible that for some classifications a patient-specific relevance criterion is used, while other classifications use a (respective, or global) specified relevance criterion (for example a fixed probability threshold value).

For example it can be known that a first classification is relevant or not relevant in a strongly patient-dependent manner while a second classification can be classified as clinically relevant or not clinically relevant practically independently of the patient. Determining a patient-specific relevance criterion could thus be omitted for the second case.

Further advantageous variants, embodiments and developments of embodiments will emerge from the subclaims and from the description with reference to the figures. It is understood that, owing to the underlying character of the present inventive idea, a large number of combinations of individual features is possible without these having to be explicitly mentioned in each case.

In accordance with some preferred variants, embodiments and developments of embodiments, the patient-specific relevance criterion is determined using a trained artificial neural network (ANN). In the prior art generally a large number of architectures is known for artificial neural networks, with what are known as convolutional neural networks in particular being suitable for the evaluation of image data. Thus convolutional layers, fully-connected layers, pooling layers and the like can be used in the trained artificial neural network.

An artificial neural network of this kind is preferably trained by supervised learning in that parameters (for example "weights" and "biases" or filter entries of a convolutional kernel) are iteratively improved in order to minimize an error function, which indicates differences between actual results of the artificial neural network based on training images and a respective target value ("label" or "ground truth") specified for each training image.

For example, training data can be generated in that for medical image data (for example a magnetic resonance tomography scan of a determined sector of the human body), for a large number of different patients in each case it is firstly established by a specialist how probable he/she deems particular classifications to be in each case in respect of particular segments (or, alternatively, it is established whether the classification applies or not). This classification by the specialist forms the "labels". The artificial neural network can then be trained until for any of the training images it outputs as an input then as an output as far as possible the "labels" as classification probability values, or comes at least desirably close to them.

An artificial neural network of this kind can also be trained in such a way that the network learns which relevance criterion is optimum, based on optimization specifications. Such optimization specifications can comprise for example: that the relevance criterion has to be as close as possible to a predetermined global relevance criterion (in order to prevent unrealistic excessive deviations therefrom); that the relevance of a classification (or: finding, or: pathology) is correctly determined; and/or the minimization of a user-specific loss function, such as is described in Zarei et al. (Zarei et al., "User Loss—A Forced-Choice-Inspired Approach to Train Neural Networks Directly by User Interaction", Bildverarbeitung für die Medizin [Image processing for medicine] 2019, Springer Vieweg, Wiesbaden, 2019, 92-97).

In accordance with some preferred variants, embodiments and developments of embodiments, the trained artificial neural network is trained and set up to receive at least the at least one segment of the medical image data as an input and, based thereon, to output at least the patient-specific relevance criterion as an output. The decision about the relevance of a segment can thus be tailored specifically to, for example, the image quality in exactly this segment. All of the medical image data can also be used as an input, however, for example to bring about a more balanced assessment.

If patient-specific relevance criteria are determined for a plurality of segments, each segment can thus be individually input into the artificial neural network, or all of the image data or a sector of the image data can be used, which comprises the plurality of segments.

It has been found that, for example, changes in tissue concomitant with the age of the patient can be effectively identified by artificial neural networks and in this way an adjusted probability threshold value can already be expediently output by an artificial neural network as a patient-specific relevance criterion. This threshold value can be used in a simple variant for all classifications since the age of the patient and the concomitant changes in tissue influence a large number of classifications.

In accordance with some preferred variants, embodiments and developments of embodiments, determining the patient-specific relevance criterion is alternatively or additionally based on patient-specific context data from outside of the medical image data.

Such patient-specific context data can originate from at least one of the following sources and/or be received from such a source:
  metadata or metadata attributes;
  text documents;
  further medical image data;
  medical findings or notes; and/or
  electronic patient files.

Metadata can comprise, for example, gender or age and originate, for example, from the automatic evaluation of DICOM headers.

Text documents can comprise, for example, medical indications, habits, previous results from clinical reports, pathologies, lab reports and the like. The context data can be extracted from the text documents for example by artificial intelligence entities for the evaluation of text documents.

Further medical image data can comprise, for example, further scans, in other words results from imaging methods, for the same patient, which were generated with different modalities (technologies or devices) to the medical image data to be evaluated.

Medical findings can comprise, for example, completed checklists on the health of the patient to be examined, dictations in natural language or the like. Dictations in natural language can be processed by artificial intelligence entities (for example artificial neural networks) for natural language processing (NLP). A keyword search for example can be carried out afterwards.

An electronic patient file can comprise, for instance, clinical indications such as suspected findings, or an assessment of a position of the patient in an examination tube of the medical imaging device (or scanner).

All of this additional context data makes it possible to take additional factors into account in the determination of the patient-specific relevance criterion, similar to a specialist in the evaluation of medical image data consciously or unconsciously taking into account all information about the patient that is current to him. It is understood that a computer-implemented method has the advantage here that it can use and take into account all known context data.

An artificial neural network is again preferably used, which is configured and trained to receive context data in predefined form, to use it as an input and, based thereon, to generate an output, which determines and/or adjusts the patient-specific relevance criterion. This artificial neural network can also be designed to receive at least the segment of the medical image data and, based thereon, to generate an output, which determines and/or adjusts the patient-specific relevance criterion, as was described in the foregoing.

Two (or even more) different artificial neural networks can also be provided: one which uses at least the segment of the medical image data as an input, and one (or more) which (in each case) receives some of the context data. Results from the individual artificial neural networks can be averaged, averaged with weight, or adjusted to each other. For example, a standard value such as 0.8 (or: 80%) can be provided by each of the provided artificial neural networks with a generated modification factor (for example 0.7 and 1.3) as the output, so at the end for example a probability threshold value of 0.8*0.7*1.3=0.728 could result as the patient-specific relevance criterion.

In accordance with some preferred variants, embodiments and developments of embodiments, context data, which is specific to different patients to the patient to be examined, is also used when determining the patient-specific relevance criterion. This has already been explained in more detail in the foregoing in connection with patient groups. The "different patients" can thus be, for example, a patient from a patient group to which the patient to be examined also belongs. Alternatively it can also be individual people, for instance a twin of the patient to be examined or a specific person selected for other reasons. Furthermore, "virtual patients" are also possible, which are generated, for instance, by anonymization of a large amount of patient data in order to safeguard data protection.

In accordance with some preferred variants, embodiments and developments of embodiments, the relevance criterion is a probability threshold value, and the clinical relevance is determined by way of comparison of a classification probability value with the associated probability threshold value. In this way a fast and also transparent assessment of the relevance can be made. A specialist can check through the assessment of the relevance for instance such that he/she compares the classification probability value with the probability threshold value acting as a relevance criterion.

It is understood that in the case of a threshold value, the value of the threshold value itself can be allocated either to the range below or to the range above. For instance, it can be provided that in the case of a threshold value x for a classification, all classification probability values less than or equal to x mean that this classification is not clinically relevant and classification probability values greater than x mean that this classification is clinically relevant. Alternatively it can be provided that in the case of a threshold value x for a classification, all classification probability values less than x mean that this classification is not clinically relevant and classification probability values greater than or equal to x mean that this classification is clinically relevant.

In accordance with some preferred variants, embodiments and developments of embodiments, a clinical relevance is determined for a large number of classifications. Thus for example different clinical/medical findings (of which each can correspond to one classification, with an additional classification denoting "no finding") can be checked simultaneously. This makes a time-saving evaluation of a plurality of classifications, or findings, possible simultaneously.

For each classification a predetermined standard relevance criterion can be provided, which is replaced by a patient-specific relevance criterion, if one is determined, and remains unchanged if no patient-specific relevance criterion is determined. In the case of probability threshold values for the classification probability values as relevance criteria, a respective predetermined standard probability threshold value can be replaced either by a newly generated probability threshold value (as a patient-specific relevance criterion) or the respective predetermined standard probability threshold value can, as described in the foregoing, be modified (or: adapted) by multiplicative (or additive) factors. Different types of the calculation forms can also be carried out for different classifications.

In accordance with some preferred variants, embodiments and developments of embodiments of the inventive apparatus, the input interface is also designed to receive context data. As has already been described in detail in the foregoing in respect of the inventive method, this can be context data, which is patient-specific to the patient to be examined, and/or be context data, which is specific to a patient who differs from the patient to be examined.

The input interface can thus be designed to receive context data for example from a Cloud storage system (or a Cloud database, in other words a Cloud-based data memory system or database system), a PACS (picture archiving and communication system), a hospital server, a database or the like, and, more precisely, via wired and/or via wireless signal carriers.

In accordance with a further aspect, embodiments of the present invention provides a computer program product, which comprises executable program code, which is designed to carry out the method in accordance with an embodiment of the inventive method when it is executed.

In addition, in accordance with a further aspect, embodiments of the present invention provides a non-volatile data storage medium, which comprises executable program code, which is designed to carry out the method in accordance with an embodiment of the inventive method when it is executed. The data storage medium can in particular be a hard disk drive, a memory stick, a DVD, a Blu-ray disk and the like.

In addition, in accordance with yet a further aspect, embodiments of the present invention provides a data stream, which comprises or represents executable program code, which is designed to carry out the method in accordance with an embodiment of the inventive method when it is executed.

BRIEF DESCRIPTION OF THE DRAWINGS

The present invention will be explained in more detail below with reference to the exemplary embodiments disclosed in the schematic figures. In the drawings.

The numbering of method steps is for the purpose of clarity and, unless stated otherwise, should in particular not imply a particular chronological sequence. In particular, a plurality of method steps can also be carried out simultaneously.

DETAILED DESCRIPTION

Figure 1:
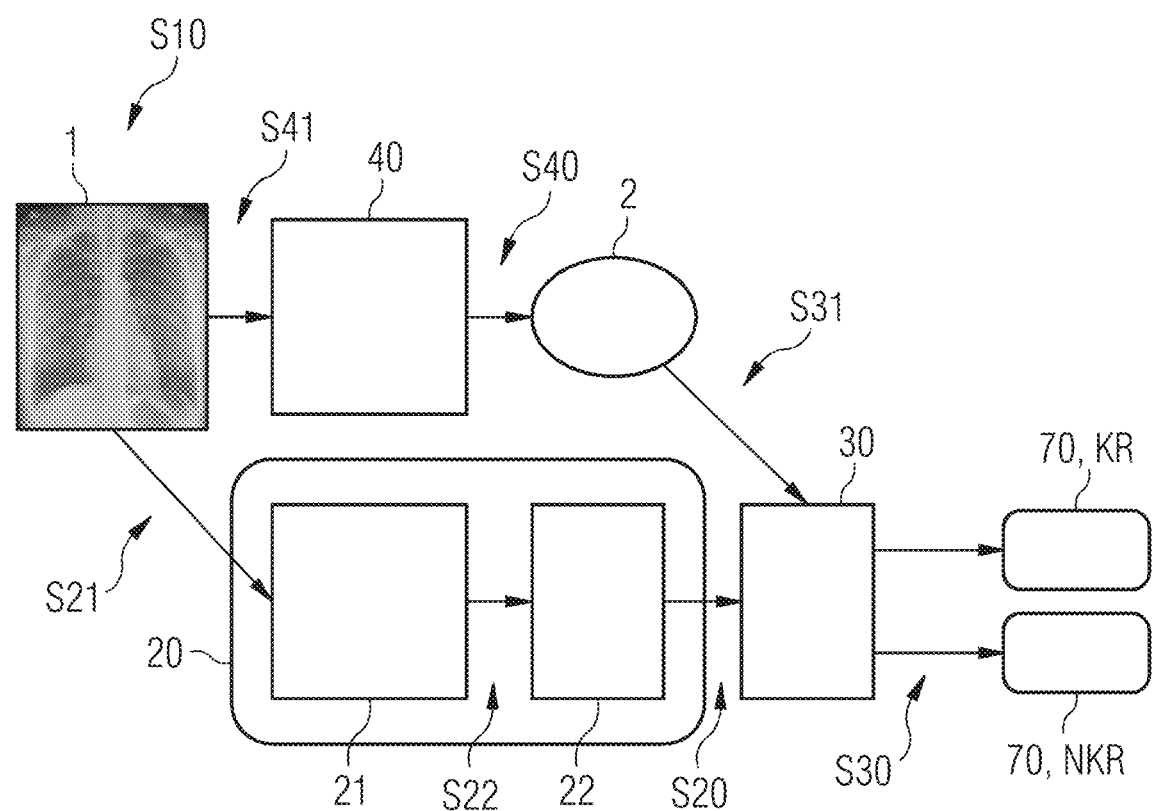
FIG. 1 shows a schematic representation of a method for the evaluation of medical image data in accordance with one embodiment.

FIG. 1 shows a schematic representation of a method for the evaluation of medical image data in accordance with one embodiment.

In a step S10 medical image data 1 of a patient to be examined is provided, for example 2-, 3-, or 4-dimensional image data with pixels or voxels, which was generated in an MRI scan, a CT scan, an X-ray image or the like of the patient. Providing S10 can comprise, for example, transferring the medical image data 1 to an apparatus, which carries out the present method. The medical image data 1 can be transferred or received, for instance, from a PACS or a Cloud database, or also directly from a medical imaging device such as an MRT scanner, a CT scanner, an X-ray device or the like. If the method is carried out inside a medical imaging device, providing S10 the medical image data 1 takes place inside the device.

The provided medical image data 1 is used in a step S21 as an input of an examination module 20, or, in other words, input into the examination module 20.

The examination module 20 is designed and adapted overall to determine S20 for at least one segment of the medical image data 1 a respective classification probability value in respect of at least one classification from a list of specified classifications.

For the sake of simplicity the method will be described below in each case only in respect of a single classification, which corresponds to a specific finding (for example "tumor"). It is understood that the method can be expanded analogously for a plurality of classifications. In addition, for the present example each pixel (or voxel) of the medical image data 1 is regarded as one segment, and a separate classification probability value is calculated for each pixel or voxel, and thus for each segment.

If the medical image data 1 is in the form, for example, of a two-dimensional image with L pixels in length and H pixels in width, with L*H pixels overall therefore, the examination module 20 should output a probability value for each of the L*H pixels such that this pixel pertains to the classification for the classification "tumor".

The examination module 20 can be implemented as hardware and/or software, in particular by way of an artificial intelligence entity (such as an artificial neural network), which is implemented and executed by its computing facility, for instance as has already been described in the foregoing or as will be described in more detail below with reference to FIG. 3.

In the embodiment of FIG. 1 the examination module 20 comprises a feature-extraction module 21, which in a step S22 is set up to extract features from the provided medical image data 1. The feature-extraction module 21 can also be designed in particular as an artificial intelligence entity, preferably an artificial neural network, which advantageously has at least one convolutional layer. Known solutions from the prior art for object recognition in (medical) image data can advantageously be used for the feature-extraction module 21.

An output of the feature-extraction module 21 is transferred to a classifier module 22 as an input, which in turn ascertains the classification probability values therefrom for the L*H pixels (or, in other words, "classifies" the pixels).

In respect of the following figures even further variants will be described in which, for instance by way of the feature-extraction module 21, individual sections of the medical image data 1 will be identified and provided with virtual bounding boxes, which can then be processed further as segments of the medical image data 1 within the meaning of the present invention, for example can be classified by the classifier module 22. It is understood that such definitions of segments can also be used in the method of FIG. 1.

With reference again to FIG. 1, the segments of the medical image data 1 to be examined are transferred in a step S41 to a relevance criterion-determination module 40, which can likewise be implemented by way of hardware and/or software. In the embodiment described in the present case, in which all pixels/voxels of the medical image data 1 are to be taken to mean segments to be examined, in particular to be classified, the transfer can take place in step S41 immediately after providing S10 the medical image data 1.

In other cases, for instance if the segments to be examined are to be determined only by the feature-extraction module 21, the procedure can be the same. It can also be provided, however, that the segments (or a section of the medical image data 1 incorporating the segments) is transferred by the feature-extraction module 21 to the relevance criterion-determination module, or is communicated to it. The latter can take place by transfer of coordinates, for instance of the bounding boxes, by the feature-extraction module 21. The relevance criterion-determination module 40 can gather the corresponding sections or segments from the medical image data 1 on the basis of the candidates.

The relevance criterion-determination module 40 in the embodiment of FIG. 1 is designed to determine a patient-specific relevance criterion in the form of a probability threshold value 2 for the one defined classification for all segments (in other words pixels/voxels) of the medical image data 1. In this embodiment the relevance criterion is thus not just patient-specific, but even also specific to the precise medical image data on which it is based.

Preferably, the relevance criterion-determination module 40 is designed as an artificial intelligence entity, preferably a trained artificial neural network, which advantageously has at least one convolutional layer. An artificial neural network of this kind can also be referred to as a "calibration parameter regression network" since the relevance criterion represents a calibration parameter of the assessment of the relevance and the network can carry out a regression of parameters on the basis of the image data.

For example, training data for training the artificial neural network of the relevance criterion-determination module 40 can be generated in that for medical image data (for example magnetic resonance tomography scan of a particular sector of the human body) for a large number of different patients, in each case it is firstly established by a specialist which probability threshold value he/she deems appropriate for a respective classification. The classification can then be used as "labels" for training data, and supervised learning can be carried out to train the artificial neural network.

Alternatively, the training data can also include as "labels" information as to whether a classification applies or not, and the artificial neural network is trained to determine the relevance criterion in such a way that, based on the training data, these "labels" are generated in each case as an output.

In a simple case, known trained artificial neural networks can also be used in the relevance criterion-determination module 40, and these determine an image quality, for example specify a value between 1 and 10, where 1 denotes "absolutely unclear" and 10 "absolutely clear", for instance in terms of lines and boundaries between objects in the QA medical image data 1. It can then be provided that a probability threshold value inversely proportional to the determined value of the image quality is set, or in accordance with such an inverse proportionality there is constant variation within a specified boundary, for instance between: image quality 1→probability threshold value 0.8; and image quality 10→probability threshold value 0.6. It is understood that these numbers can be adjusted arbitrarily to the actual ratios and applications.

The artificial neural network of the relevance criterion-determination module 40 receives the segments of the medical image data 1 to be examined, transferred in step S41, as an input and on the basis thereof and by using its parameters adjusted by the training generates the probability threshold value 2 in a step S40.

In a step S31 a relevance-determination module 30, which also receives the classification probability values generated by the examination module, is provided with the generated probability threshold value 2. By comparing the classification probability values for the different segments (here: pixels/voxels) with the probability threshold value 2, the relevance-determination module 30 assesses in a step S30 the clinical relevance for each segment and outputs a corresponding output signal 70, which indicates the clinical relevance (KR) or otherwise the absence of clinical relevance (KNR).

The output signal 70 can comprise, for example, only those segments, or highlight in the medical image data 1 only those segments with bounding boxes, which were indicated as being clinically relevant. The relevance-determination module 30 can also be designed as hardware and/or software.

The output signal 70 can be designed, for example, to control a display facility, which displays medical image data 1 with highlighted positions in which the classification was determined as clinically relevant.

Figure 2:
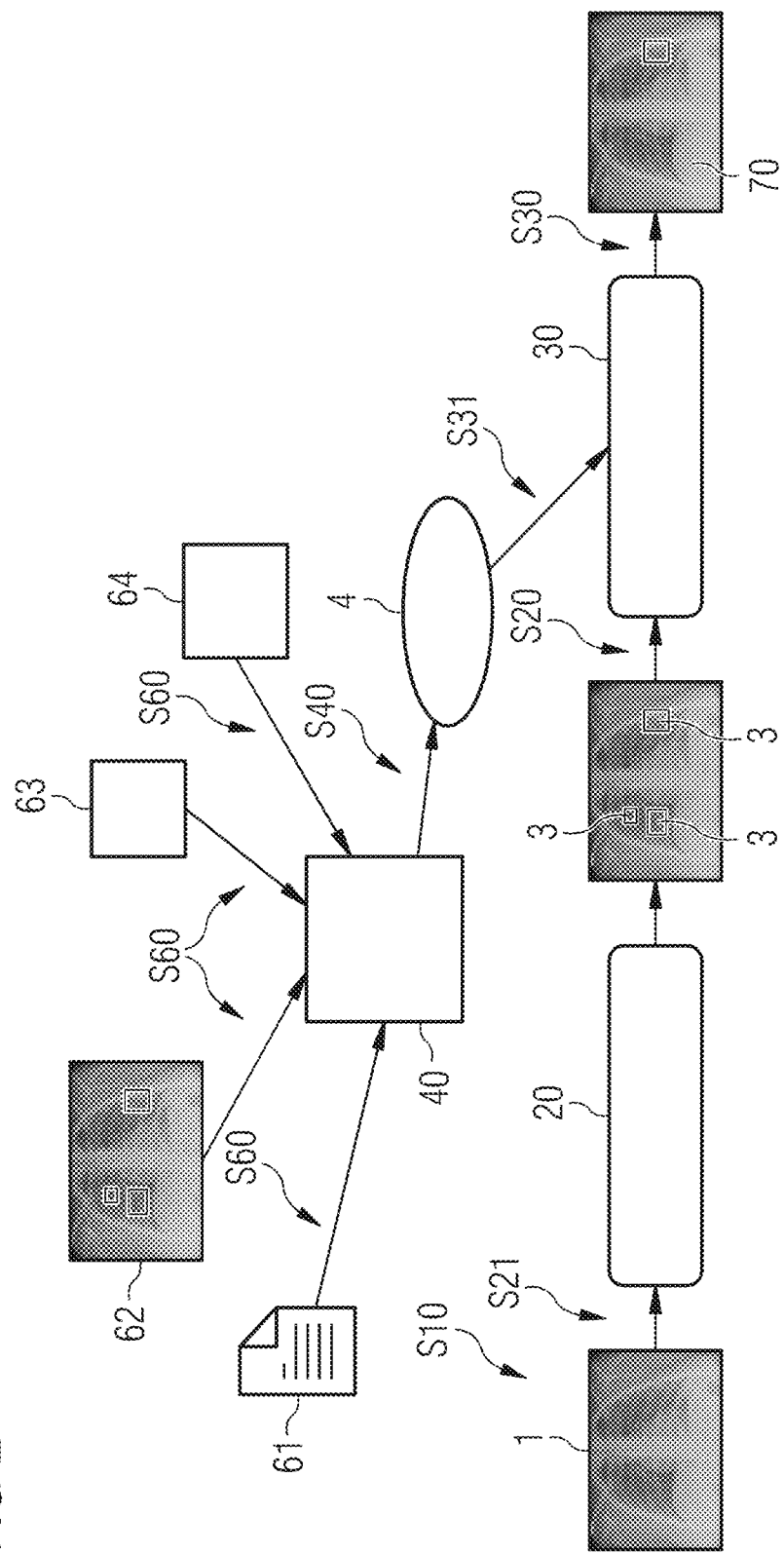
FIG. 2 shows a schematic representation of a method for the evaluation of medical image data in accordance with a further embodiment.

FIG. 2 shows a schematic representation of a method for the evaluation of medical image data in accordance with a further embodiment.

The embodiment of FIG. 2 resembles in some points that of FIG. 2, so only the differences will be explained below. The fundamental differences are twofold: firstly, in the embodiment of FIG. 2, context data is used to determine the relevance criterion 2, and secondly, individual segments 3 to be examined are defined, for which in each case the clinical relevance of the classification is to be assessed. In this example too, only a single classification is assumed, it being understood that it is possible to expand the method without problems to a large number of classifications.

Accordingly, in the embodiment of FIG. 2 too, the medical image data 1 provided in step S10 is transferred to an examination module 20 in step S21. As described in the foregoing, this can likewise comprise a feature-extraction module 21 and/or a classifier module 22. The examination module 20 can, however, also have a different construction, for example without said division into two, in other words comprising for example only a single trained artificial neural network.

FIG. 2 shows as an example of medical image data 1 a scan of a human thorax. The examination module 20 is adapted here (and optionally trained) to identify suspicious segments 3 (or: those of interest), based on the medical image data 1 as the input, for instance by determining associated bounding boxes. Such segments 3 can be ascertained in accordance with methods known in the prior art. The examination module 20 again determines in step S20 classification probability values for the segments 3. FIG. 2 illustrates three different segments 3 with bounding boxes of different sizes.

As in the preceding exemplary embodiment of FIG. 1 too, the relevance-determination module should now determine in step S30 the clinical relevance of the classification (or, with a plurality of classifications: the clinical relevance of each of the classifications) for every segment 3. A patient-specific relevance criterion 4 is inventively used again for this, however. The patient-specific relevance criterion 4 is again generated by a relevance criterion-determination module 40 in a step S40 and transferred in a step S31 to the relevance-determination module 30.

The patient-specific relevance criterion can again be a probability threshold value 2, as was explained in detail on the basis of FIG. 1. Alternatively, other patient-specific relevance criteria are also conceivable, however, which are not based, or are not solely based, on the classification probability values. For example, the relevance criterion can also relate to a size of the bounding box or, synonymous therewith, a size of the segments 3. The relevance criterion 4 could thus comprise a segment-size threshold value, which differentiates the segments 3 into larger (clinically relevant) segments on the one hand and smaller (not clinically relevant) segments on the other hand.

The relevance criterion 4 can also comprise both a segment size threshold value and a probability threshold value 2, so for instance only those segments 3 shall be assessed as clinically relevant, which have both a classification probability value above the probability threshold value 2 and a size above the segment size threshold value. More complex rules with respective weights and other measures for the segments 3 are also conceivable.

In the embodiment of FIG. 2 the relevance criterion-determination module 40 takes into account patient-specific context data 61, 62, 63, 64 with which in a respective step S60 the relevance criterion-determination module 40 is provided, for instance via a corresponding input interface or internal interface.

By way of example, but not conclusively, FIG. 2 illustrates different context data or context data sources:

text document context data 61 from one or more text document(s), which describe, for example, habits of the patient or results of earlier examinations;

medical image data 62 (or information based thereon or extracted therefrom) from earlier examinations of the same (or even a different) patient, for instance size and position of segments 3 already previously classified as suspicious;

image metadata 63 of the medical image data 1 (or the previous medical image data 62), for instance information about age, gender, etc. of the patient, extracted from a DICOM header;

examination data 64 relating to the current examination, which generated the medical image data 1.

Taking into account medical image data 62 of the same patient from previous examinations also makes complex relevance criteria possible, for example, whether a "suspicious segment" 3 has shrunk or enlarged over time. As part of a relevance criterion for such a segment 3 it could thus be provided that the segment is regarded as clinically relevant if it has enlarged or has remained the same size, and is regarded as not clinically relevant (or depending on the gradation as "possibly clinically relevant") if it has shrunk, wherein the case of the size remaining the same could also be allocated differently. It can thus be predetermined for instance that enlarging segments 3 are always determined as "clinically relevant" irrespective of any other possible relevance criteria.

It is understood that the relevance criterion-determination module 40a can be provided with a wide variety of different patient-specific context data, but also context data specific to other patients. Similarly, the relevance criterion-determination module 40 can also still have the functionality as in FIG. 1, in other words is capable of generating some of the relevance criterion 4 (such as a probability threshold value) from the medical image data 1 itself.

The respective context data can be used by the relevance criterion-determination module 40 to carry out group-specific assessments, in other words in particular to organize the patients in a group with other patients and to determine (inter alia, or also solely) the patient-specific relevance criterion 4 based on this grouping.

If the, as it were, image-intrinsic processing as in the embodiment of FIG. 1 and the use of additional context data as in the embodiment of FIG. 2 are both carried out, these two partial steps can advantageously be carried out on different platforms, on different devices, in different environments or by different applications.

The reason for this is that the image-intrinsic processing of FIG. 1 can substantially take place anonymously, in other words without knowledge of the identity of the patient and fewer requirements (for example relating to data protection) can exist for this than for the use of context data, which could be subject to stricter requirements. The image-intrinsic processing could thus be carried out, for instance, by a Cloud computing platform, while the further processing, including the use of context data, could then be carried out on-premise, in other words for instance in the secure network of a hospital or research institute.

Figure 3:
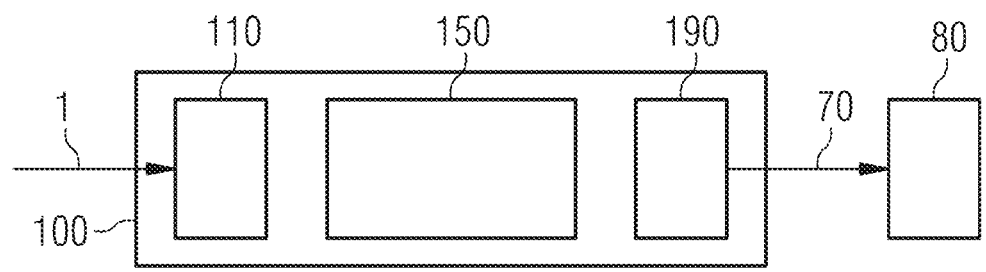
FIG. 3 schematically shows an apparatus for the evaluation of medical image data in accordance with a further embodiment.

FIG. 3 schematically illustrates an apparatus 100 for the evaluation of medical image data in accordance with a further embodiment of the present invention. The apparatus 100 is adapted, in particular, for carrying out the inventive method for the evaluation of medical image data, preferably in accordance with one of the embodiments illustrated using FIG. 1 and/or FIG. 2 or in accordance with the preliminary discussion. Reference will be made therefore substantially to the foregoing description and also to FIG. 1 and FIG. 2.

The apparatus 100 comprises an input interface 110 via which the apparatus 100 can be provided with medical image data 1 to be evaluated of a patient to be examined. The apparatus 100 also comprises a computing facility 150.

The computing facility 150 can comprise, in particular, a central processing unit (CPU), a data memory, a main memory (RAM) and/or a graphics processor (GPU), which are operatively coupled together and cooperate with each other to execute software.

The computing facility 150 is advantageously set up to implement and execute one, a plurality or all of the modules 20, 21, 22, 30, 40 described in the foregoing in the form of software.

The computing facility can thus advantageously be set up:

to determine for at least one segment 3 of the medical image data 1 a respective classification probability value in respect of at least one classification from a list of specified classifications, for instance by implementing and executing the examination module 20;

to determine a patient-specific relevance criterion 4 for at least one of the at least one classifications for the provided medical image data 1, for instance by implementing and executing the relevance criterion-determination module 40; and to determine a clinical relevance of the at least one of the at least one classifications for the at least one segment 3 of medical image data 1 using the associated determined patient-specific relevance criterion 4 and based on the determined classification probability values and/or based on the at least one segment 3, for instance by implementing and executing the relevance-determination module 30.

It is understood that the computing facility 150 can also implement and execute all further modules or sub-modules, and that all further described variants, modifications and developments of embodiments in respect of the inventive method can also be realized by the apparatus 100.

The apparatus 100 also comprises an output interface 190, which is set up to output the output signal 70, which indicates the determined clinical relevance(s). The output signal 70 can be transferred to a display facility 80 via the output interface 190, so the medical image data 1 is automatically displayed for example with highlighted segments 3 with clinical relevance.

The display facility 80 can be located outside of the apparatus 100 or be designed as part of the apparatus 100. The display facility 80 can also be part of a local computer or terminal while the computing facility 150 of the apparatus 100 is designed as a Cloud-computing platform. The display facility can comprise, in particular, a processor (CPU), a graphics processor (GPU), a data memory and a main memory (RAM), which process the output signal 70 in order to display the medical image data 1 with the highlighted segments 3 with clinical relevance.

The input interface 110 can also be designed to receive S60 context data 61, 62, 63, 64, which is patient-specific to the patient to be examined and/or which is specific to a patient who differs from the patient to be examined. This context data 61, 62, 63, 64 can thus be taken into account when determining the relevance criterion 4, as was already explained in detail in the foregoing.

Figure 4:
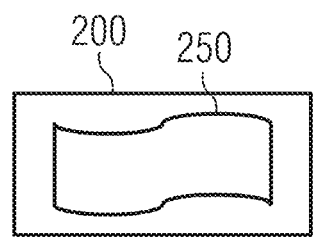
FIG. 4 schematically shows a computer program product in accordance with yet a further embodiment.

FIG. 4 schematically shows a computer program product 200 in accordance with yet a further embodiment. The computer program product 200 comprises executable program code 250, which is configured, when it is executed (for example by a local and/or a Cloud-linked computing facility), to carry out the inventive method in one of its embodiments.

Figure 5:
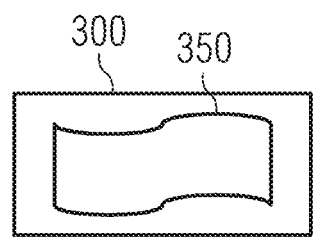
FIG. 5 schematically shows a data storage medium in accordance with yet a further embodiment.

FIG. 5 schematically shows a non-volatile, computer-readable data storage medium 300 in accordance with yet a further embodiment. The data storage medium 300 comprises executable program code 350, which is configured, when it is executed (for example by a local and/or a Cloud-linked computing facility), to carry out the inventive method in one of its embodiments.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The exemplary embodiments were selected and described in order to be able to best illustrate the principles underlying the present invention and their possible applications in practice. Persons skilled in the art can consequently optimally modify and use the present invention and its different exemplary embodiments in relation to the intended purpose.

What is claimed is:

1. A computer-implemented method for evaluating medical image data, the computer-implemented method comprising:
providing medical image data of a patient to be examined;
determining, for at least one segment of the medical image data, a respective classification probability value with respect to at least one first classification from a list of specified classifications;
determining a patient-specific relevance criterion corresponding to at least one second classification for at least the at least one segment, the at least one second classification being among the at least one first classification, and the patient-specific relevance criterion being based on at least one of
a quality of the medical image data,
a property of the at least one segment, or
an age of the patient to be examined;
determining a clinical relevance of the at least one second classification for the at least one segment using the patient-specific relevance criterion based on at least the respective classification probability value; and
outputting an output signal indicating the clinical relevance.

2. The computer-implemented method as claimed in claim 1, wherein the determining of the patient-specific relevance criterion is performed using at least one trained artificial neural network.

3. The computer-implemented method as claimed in claim 2, wherein the determining of the patient-specific relevance criterion is based on patient-specific context data from outside of the medical image data.

4. The computer-implemented method as claimed in claim 2, wherein the determining of the patient-specific relevance criterion is based on context data that is specific to patients other than the patient to be examined.

5. The computer-implemented method as claimed in claim 2, wherein
the patient-specific relevance criterion is a probability threshold value; and
the determining of the clinical relevance includes comparing the respective classification probability value with the probability threshold value.

6. The computer-implemented method as claimed in claim 2, wherein the at least one trained artificial neural network is trained and configured to:
receive as an input at least one of
the medical image data corresponding to the quality,
the at least one segment corresponding to the property, or
patient-specific context data or the medical image data corresponding to the age of the patient to be examined; and
output at least the patient-specific relevance criterion based on the input.

7. The computer-implemented method as claimed in claim 6, wherein the determining of the patient-specific relevance criterion is based on patient-specific context data from outside of the medical image data.

8. The computer-implemented method as claimed in claim 6, wherein the determining of the patient-specific relevance criterion is based on context data that is specific to patients other than the patient to be examined.

9. The computer-implemented method as claimed in claim 3, wherein
the patient-specific relevance criterion is a probability threshold value; and
the determining of the clinical relevance includes comparing the respective classification probability value with the probability threshold value.

10. The computer-implemented method of claim 6, wherein
the at least one trained artificial neural network includes a first trained artificial neural network and a second trained artificial neural network;
the first trained artificial neural network is trained and configured to
receive as a first input at least one of
the medical image data corresponding to the quality, or
the at least one segment corresponding to the property, and
output at least the patient-specific relevance criterion based on the first input;
the second trained artificial neural network is trained and configured to
receive as a second input the patient-specific context data or the medical image data corresponding to the age of the patient to be examined, and
output at least the patient-specific relevance criterion based on the input; and
the determining of the clinical relevance includes combining the output of the first trained artificial neural network and the output of the second trained artificial neural network.

11. The computer-implemented method as claimed in claim 1, wherein the determining of the patient-specific relevance criterion is based on patient-specific context data from outside of the medical image data.

12. The computer-implemented method as claimed in claim 11, wherein the determining of the patient-specific relevance criterion is based on context data that is specific to patients other than the patient to be examined.

13. The computer-implemented method as claimed in claim 11, wherein the patient-specific context data at least one of originates or is received from at least one of
metadata attributes,
text documents,
further medical image data,
medical findings or notes, or
electronic patient files.

14. The computer-implemented method as claimed in claim 1, wherein the determining of the patient-specific relevance criterion is based on context data that is specific to patients other than the patient to be examined.

15. The computer-implemented method as claimed in claim 1, wherein
the patient-specific relevance criterion is a probability threshold value; and
the determining of the clinical relevance includes comparing the respective classification probability value with the probability threshold value.

16. The computer-implemented method as claimed in claim 1, wherein
the determining of the clinical relevance includes determining the clinical relevance corresponding to a number of classifications, the number of classifications including the at least one second classification; and
the method further includes
providing a respective standard relevance criterion for each among the number of classifications, and
replacing the respective standard relevance criterion for each among the number of classifications with a corresponding patient-specific relevance criterion.

17. A non-transitory computer program product storing computer-executable instructions that, when executed by a computer, cause the computer to carry out the method as claimed in claim 1.

18. A non-transitory computer-readable medium storing computer-executable instructions that, when executed by a computer, cause the computer to carry out the method as claimed in claim 1.

19. The computer-implemented method of claim 1, wherein
the at least one segment is at least one of one or more pixels or one or more voxels of a medical image; and
the patient-specific relevance criterion is a value specific to the patient and for evaluating whether the at least one second classification for the at least one segment is clinically relevant.

20. The computer-implemented method of claim 1, wherein the patient-specific relevance criterion is determined based on the at least one segment without metadata for the patient.

21. The computer-implemented method of claim 1, wherein
the output signal indicates that the at least one second classification is clinically relevant for the at least one segment; and
the output signal causes at least one of
display of the at least one segment with a highlight, or
automatic triggering of a workflow.

22. The computer-implemented method of claim 1, further comprising:
generating the medical image data by performing a scan using a medical imaging device to obtain raw data, the medical image data being based on the raw data, wherein the output signal indicates that the at least one second classification is clinically relevant for the at least one segment, and the output signal causes display of the at least one segment with a highlight.

23. An apparatus to evaluate medical image data, the apparatus comprising:

an input interface configured to be provided with medical image data of a patient to be examined;

a computing device configured to determine, for at least one segment of the medical image data, a respective classification probability value with respect to at least one first classification from a list of specified classifications, determine a patient-specific relevance criterion corresponding to at least one second classification for at least the at least one segment, the at least one second classification being among the at least one first classification, and the patient-specific relevance criterion being based on at least one of a quality of the medical image data, a property of the at least one segment, or an age of the patient to be examined, and determine a clinical relevance of the at least one second classification for the at least one segment using the patient-specific relevance criterion based on at least the respective classification probability values; and an output interface configured to output an output signal indicating the clinical relevance.

24. The apparatus as claimed in claim 23, wherein the input interface is configured to receive context data, the context data being at least one of patient-specific for the patient to be examined or specific to a patient that differs from the patient to be examined.

25. An apparatus to evaluate medical image data of a patient, the apparatus comprising:

at least one processor; and a memory storing computer-executable instructions, the at least one processor being configured to execute the computer-executable instructions to cause the apparatus to determine, for at least one segment of the medical image data, a respective classification probability value with respect to at least one first classification from a list of specified classifications, determine a patient-specific relevance criterion corresponding to at least one second classification for at least the at least one segment, the at least one second classification being among the at least one first classification, and the patient-specific relevance criterion being based on at least one of a quality of the medical image data, a property of the at least one segment, or an age of the patient to be examined, determine a clinical relevance of the at least one second classification for the at least one segment using the patient-specific relevance criterion based on at least the respective classification probability values, and output an output signal indicating the clinical relevance.

* * * * *